Sept. 19, 1961  J. H. POLLARD  3,000,413
ASSEMBLY MEANS FOR A CYLINDRICAL PLANER HEAD
Filed May 31, 1960
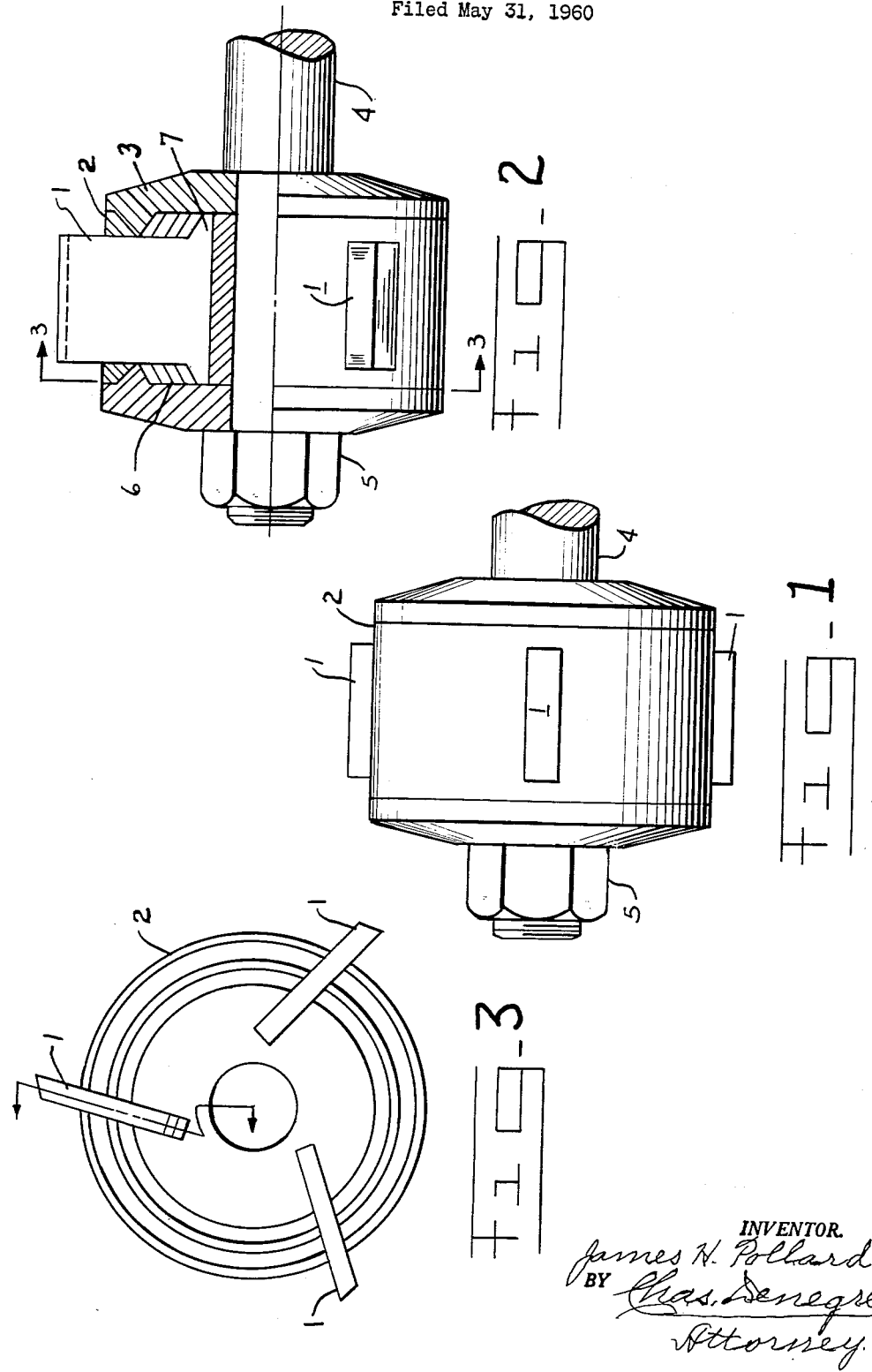
INVENTOR.
James H. Pollard
BY Chas. Denegre
Attorney.

United States Patent Office 3,000,413
Patented Sept. 19, 1961

3,000,413
ASSEMBLY MEANS FOR A CYLINDRICAL
PLANER HEAD
James H. Pollard, R.F.D. 1, Glencoe, Ala.
Filed May 31, 1960, Ser. No. 32,905
3 Claims. (Cl. 144—230)

This invention relates to a quick interchangeable boltless planer head. It has for its main objects to provide such a planer head that will be highly satisfactory for the purpose intended, simple in structure, comparatively cheap to manufacture, easy to keep in working condition, and extremely durable.

Further objects are to provide a planer head without complicated screws and bolts; enables one to install knives without removing the whole head; to change the knives from one type to another; it is perfectly safe against any knife becoming loose or throwing a knife; it will save considerable time in manual work hours and it is less expensive to the employer as one head with proper knives will serve as several planer heads.

Other objects and advantages will appear from the drawing and specification.

By referring generally to the drawing it will be observed that—

FIG. 1 is a side view of a planer head made according to this invention mounted on the end of a shaft.

FIG. 2 is a side view showing parts in section and parts in full line of the elements in FIG. 1.

FIG. 3 is a sectional view on line 3—3 of FIG. 2.

Similar reference numerals refer to similar parts throughout the several views.

Referring to the drawing in detail it will be seen that the planer head comprises blades 1, a main body 2, flanges 3, mounted on a shaft 4, having a nut 5, and shims 6. The blades are provided with a wide bottom portion 7 as means for being held in place by the shims.

From the foregoing it will appear that the blades are shaped to be held in place for use by being mounted on the body and held in place by the flanges and shims and held tightly in place by the nut on the end of the shaft. Thus it will appear that no other screws or bolts are required to hold the blades in place for use on the shaft, and the assembled parts can be easily separated by removing the nut. The blades have an extended inner end portion slightly V shaped and the shims are made to fit such shape. In other words they are not made flat. This structure better holds the blades rigid for use.

The various parts of the structure may be made of any material suitable for the purpose, but I prefer to use good grades of metal. Also the parts may be made in different sizes and capacities depending on how and where to be used.

While I have shown and described the preferred embodiment of my invention, I do not wish to limit the same to the exact and precise details of structure, and I reserve the right to make all modifications and changes so long as they remain within the scope of the invention and the following claims.

Having described my invention I claim:

1. A quick interchangeable boltless planer head comprising, a main supporting body, a drive shaft, said body being mounted removably on the shaft, three cutting blades, each of said blades having an integral wide portion as its bottom, two flanges, said flanges being part of the supporting body, two shims, said shims being located in the body structure in engagement with the wide bottoms of the blades, screw threads on an end of the shaft, a comparatively large nut, said nut being mounted on the threaded end of the shaft as a means for tightly holding the assembled body and blades together for use.

2. A quick interchangeable boltless planer head comprising, a main supporting body, a drive shaft, said body being mounted removably on the shaft, a plurality of cutting blades, each of said blades having an integral wide portion as its bottom, two flanges, said flanges being part of the supporting body, two shims, said shims being located in the body structure in engagement with the wide bottoms of the blades, screw threads on an end of the shaft, a comparatively large nut, said nut being mounted on the threaded end of the shaft as a means for tightly holding the assembled body and blades together for use.

3. An interchangeable blade planer head comprising in combination in tight condition a main supporting body, a drive shaft, said body being mounted removably on the shaft, three cutting blades, each of said blades having an integral wide portion as its bottom, two flanges, said flanges being part of the supporting body, two shims, said shims being located in the body structure in engagement with the wide bottoms of the blades, screw threads on an end of the shaft, a comparatively large nut, said nut being mounted on the threaded end of the shaft as a means for tightly holding the assembled body and blades together for use.

References Cited in the file of this patent

UNITED STATES PATENTS

| | | |
|---|---|---|
| 13,386 | Dunlap | Aug. 7, 1855 |
| 81,859 | Wright | Sept. 1, 1868 |
| 229,588 | Clark | July 6, 1880 |
| 547,455 | Schmidt | Oct. 8, 1895 |
| 560,166 | Holder | May 12, 1896 |
| 953,949 | Hauser | Apr. 5, 1910 |
| 2,591,614 | Sacrey | Apr. 1, 1952 |
| 2,813,558 | Pedersen | Nov. 19, 1957 |

FOREIGN PATENTS

| | | |
|---|---|---|
| 680,582 | France | Jan. 22, 1930 |